Oct. 7, 1958 A. C. BERNSTEIN 2,855,461
SCHOOL TO HOME COMMUNICATION SYSTEM
Filed March 8, 1957
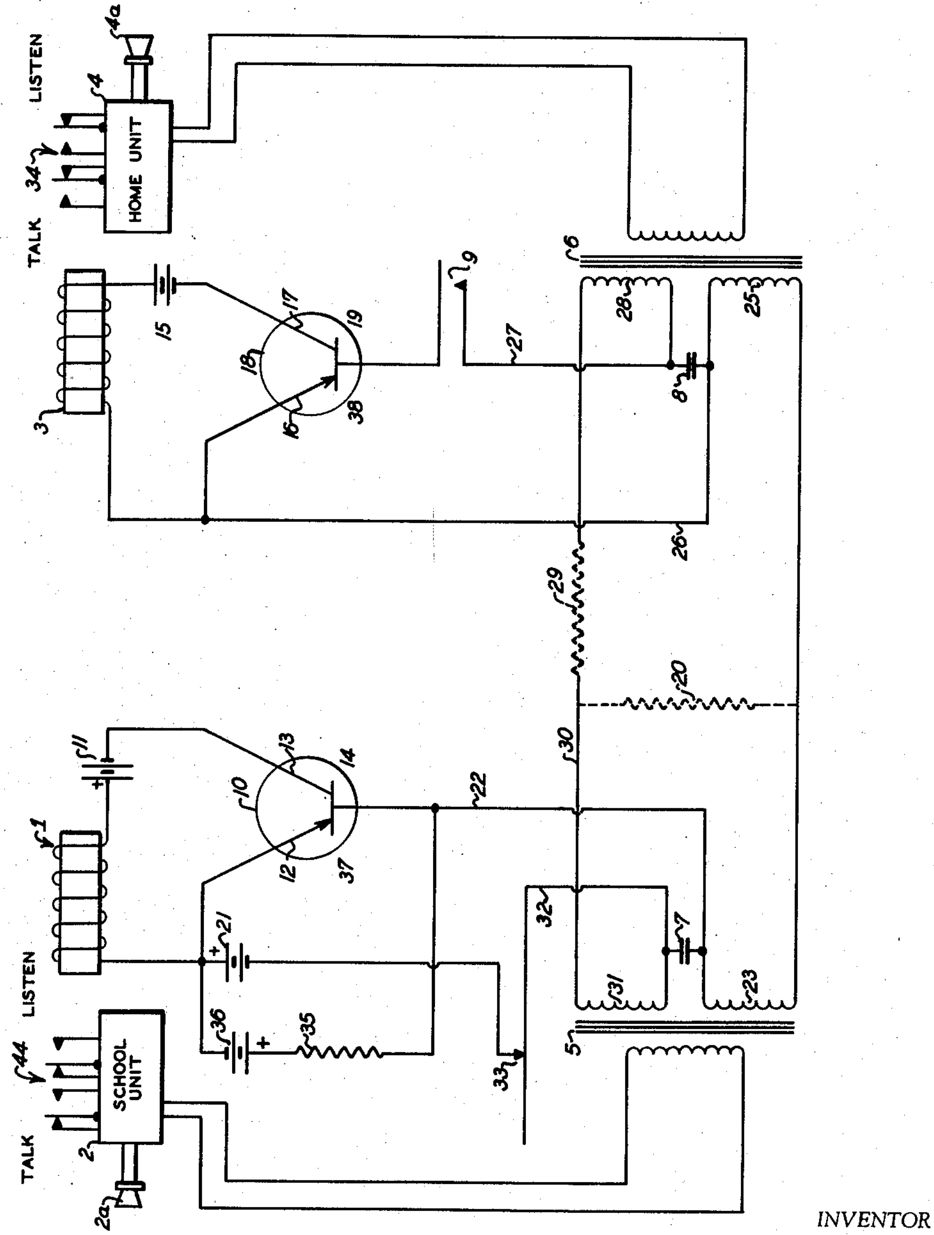
INVENTOR
ALLAN C. BERNSTEIN
BY Burgess, Dinklage & Sprung
ATTORNEY United States Patent Office 2,855,461

Patented Oct. 7, 1958

2,855,461

SCHOOL TO HOME COMMUNICATION SYSTEM

Allan C. Bernstein, Kings Point, N. Y., assignor of one-third to Nathaniel A. Karr, New York, and one-third to Philip H. Seaman, Bronxville, N. Y.

Application March 8, 1957, Serial No. 644,807

13 Claims. (Cl. 179—1)

This invention relates to new and useful improvements in a school-to-home communication system.

In my United States Patent 2,529,069, of November 7, 1950, a school-home system is described which allows a handicapped or bedridden child at home to listen in and actually take part in classroom proceedings through an intercommunication system which operates over a rented telephone line. This system provides two way transmission over a single telephone line pair with amplification at both ends of the line and allows a switching operation, manually controlled, at the home unit to reverse the transmission direction of the system as a whole thus allowing the student to communicate with the classroom in order to ask questions, recite or the like. The actuation of a "press to talk" button by the student at the home unit reverses the transmission direction in his unit and at the same time passes a direct current signal over the telephone line which actuates a relay reversing the transmission direction at the school unit.

In actual practice certain difficulties arise since the reversal of the transmission direction is entirely at the control of the student. If, for example, the student is called upon to recite and rambles on at great length, the teacher has no satisfactory means of interrupting and the only recourse resides in disabling the system as a whole, as for example, by pulling out the plug which connects the classroom speaker to the school system, and thereafter waiting a reasonable interval to allow the homebound student to finish speaking and release the talk switch before reconnecting the speaker in to the system.

One object of this invention is an improved construction of a school-to-home intercommunication system which will permit the teacher to reverse the direction of transmission, restoring it to the normal direction of school-to-home, irrespective of the position of the manual switching control in the home unit.

A further object of this invention is an improved construction of the school-to-home intercommunication system which will allow the student to reverse the direction of transmission in order to ask questions or recite, which will permit the teacher to again reverse the direction of transmission restoring it again to the normal direction of school-to-home irrespective of the position of the student's manual switch and which will allow the switching operation over telephone lines having high leakage between the two wires in the telepone pair. These, and still further objects, will become apparent from the following description read in conjunction with the drawing which diagrammatically shows a wiring diagram of a modified school-to-home system in accordance with the invention.

The electrical intercommunication system to which the improvement in accordance with the invention is directed, has electrical transducers at separated points with a two wire transmission line, such as a two wire telephone line, coupling them. One of these transducers is preferable part of a home unit and the other preferable part of a school unit. Electrical switching means are provided for establishing the direction of speech transmission i. e. electrical audio signal flow between the transducers over the transmission line. The direction is normally with the transducer in the school operating as a microphone through the telephone line with the transducer of the home unit acting as a speaker. The switching means include manually operable means such as a press to talk switch associated with one of the transducers as, for example at the home unit, and automatically operable means such as a relay actuated switch associated with the other transducer as, for example, at the school unit. Means including the two wire transmission lines are provided for operating the automatically operable means by operation of the manually operable means so that, for example, when the student presses the press to talk button associated with the home unit, to reverse the transmission direction in this unit, a direct current electrical impulse signal is sent through the telephone lines which actuates the relay in the school unit simultaneously reversing the transmission direction in this unit.

In accordance with the improved construction, in accordance with the invention, over-riding priority control means including a manually operable switch, is provided at the school unit for establishing a direction of electrical audio signal flow from the transducer of the school unit as a microphone to the transducer of the home unit as a speaker irrespective of the position of the manually operating means from the home unit. This allows the teacher to reestablish the normal direction of school-to-home transmission irrespective of the position of the manual switch in the home unit and thus to interrupt the recitation of the student when necessary.

In accordance with the preferred constructional embodiment of the invention, the switching means for establishing the direction of electrical audio signal flow between the transducers over the transmission line includes a separate relay operated switch, transistor and D. C. current source associated with each transducer. In each of these units associated with a transducer the collector circuit of the transistor, the D. C. source and the coil of the relay operated switch, are connected in series. A circuit including the transmission line is formed connecting the emitter base junction circuits of the transistors in series with each other, and a D. C. current source is provided for this series circuit. Two switches are provided in this series circuit, one associated with one of the transducers, i. e. at the school unit, and the other associated with the other transducer at the home unit. The switch at the home unit is preferably normally open and serves as a press to talk switch for the student while the switch at the school unit is preferably normally closed and serves as the over-riding priority control switch. The switching means establish one direction of electrical audio signal flow upon deenergization of the relays and a reverse direction of electrical audio signal flow upon energization of both relays. The direction of audio signal flow upon deenergization of both relays is preferably the normal school-to-home direction.

In order to provide wide design tolerances when taking into consideration the resistance leakage across the telephone lines, in accordance with a preferred embodiment of the invention, a resistance and a D. C. current source of opposed polarity to the normal D. C. current source supplying the circuit is connected in parallel with the emitter base junction circuit of one of the transistors, and preferably the transistor of the school unit.

Referring to the embodiment shown in the drawing, 2 represents the school unit comprising, for example, a reversible amplifier and transducer 2*a*.

The transducer 2*a* is preferably a permanent magnet type dynamic unit which may be operated either as a microphone or a loud speaker.

In a similar manner 4 represents the home unit, comprising for example a reversible amplifier with the transducer 4a which again is preferably a permanent magnet type dynamic unit suited for operation as either a microphone or loud speaker.

The construction of the school unit 2 and home unit 4 may be identical to that described in my Patent 2,529,069. The school unit 2 is provided with a switch 44 for reversing the transmission direction of the unit. This switch will have the identical construction of the switch provided for this purpose in my said patent. The switch is normally biased in a position as shown so that the amplifier of the unit allows the transducer 2a to be used as a microphone with the school unit 2 transmitting the electrical audio signal over the transmission lines as will be described in further detail.

An electro-magnetic relay 1 is provided which, when energized, will actuate the switch 44 reversing the direction of the school unit so that the transducer 2a will act as a speaker.

In the same manner, the home unit 4, which may have the identical construction as the unit described in said patent, is provided with a switch 34 for reversing the transmission direction of the unit. The switch 34 may have the identical construction of the switch provided for this purpose in my said patent except that the same, rather than being manually operated is electro-magnetically operated by a relay 3 and does not have the additional switching unit for sending a direct current impulse over the transmission lines to actuate the relay in the school unit. The switch 34 is normally biased to a position at which the amplifier of the home unit will allow the transducer 4a to act as a loud speaker but will be reversed upon energization of the relay 3 so that the transducer 4a will act as a microphone.

The audio connection between the school unit and the home unit is established by means of the transformers 5 and 6 and the telephone line pair 24—30 in the identical manner as directed in the said patent.

The relay 1 is connected in series with a source of D. C. current 11 and the emitter and collector of the transitor 10. As shown, the transitor is of the PNP type, but could, of course be of the NPN type with a reverse of the D. C. polarity.

The D. C. current source is represented as a battery 11 but, of course, may be any D. C. current source and in actual practice is preferably a source derived from the common power supply for the whole school portion of the system.

In the identical manner, the relay 3 is connected in series with the D. C. current source 15 corresponding to the D. C. source 11 and the emitter 16 and collector 17 of the transistor 18.

The emitter base junction circuits of the transistors 10 and 18 are connected in series with each other and with the source of D. C. current 21 through the telephone line pairs 30 and 34. The current path of this circuit is from the positive side of D. C. current source 21 through the emitter 12 of the transistor 10 through the base junction 37 and base 14 of the transistor and connecting wire 22 through the coil 23, the telephone line 24, the coil 25, the connecting line 26, the emitter 16 of the transistor 18, and the base junction 38 and base 19 of the transistor 18, the manually operated switch 9, the line 27, the coil 28, the telephone line 30, the coil 31, the line 32, manually operated switch 33, back to the negative side of D. C. current source 21.

The coils 23 and 31 of the transformer 5 and the coils 28 and 25 of the transformer 6, of course act as conductors for the D. C. current along the path described. The condensers 7 and 8, while providing connection for the audio signal, between coils 31—23 and 28—25 respectively, do not provide a D. C. connection.

It is thus apparent that with both these switches 9 and 33 closed, current will flow from the D. C. current source 21 across the emitter-base junctions of the transistors 10 and 18. With current flow across the emitter-base junctions of the transistors, in accordance with the transistor characteristics, collector current will flow through the transistors so that the relay 1 will be energized by the current from the D. C. source 11 flowing through the relay and the collector circuit of the transistor 10 and the relay 3 will be energized by D. C. current from the source 15 flowing through this relay and the collector circuit of the transistor 18. With current flow through the relays 1 and 3 respectively, the switches 44 and 34 respectively will be reversed.

In operation with the manually operated switch 33 of the school unit normally closed and the manually operated switch 9 at the home unit normally open, the circuit through the emitter base junction of the transistors 10 and 18 is interrupted so that no current will flow through these junctions from the D. C. source 21. Therefore, in accordance with the transistor characteristics, sufficient current from the D. C. source 11 will not flow through the transistor collector circuit of the transistor 10 and sufficient current from the D. C. current source 15 will not flow through the collector circuit of the transistor 18 to operate the associated relay. The relays 1 and 3 will thus be deenergized and the switches 44 and 34 will be biased in the position shown so that the school unit will act as a transmitter, the home unit as a receiver, the audio signal passing through the transducer 2a acting as a microphone through the transformer 5, telephone lines 30—24, transformer 6 and home unit 4 to the transducer 4a acting as a speaker.

If the student, at the home unit, desires to ask a question or recite, he merely presses the manually operated switch 9 which acts as a press to talk or talk-listen switch, closing the same. This closes the series circuit through the D. C. current source 21 and emitter base junction circuit of the transistors 10 and 18 causing a flow of D. C. current from the D. C. source 21 through the emitter-base junctions of the transistors. The current flow through the emitter-base junctions will cause sufficient collector current to flow so that the relay 1 will be energized by the D. C. current from the current source 11 and the relay 3 will be energized from the D. C. current flow from the D. C. source 15. With energization of the relays 1 and 3, the positions of the switches 44 and 34 are reversed with the home unit acting as a transmitter and the school unit as a receiver. The audio signal thus then flows through the transducer 4a acting as a microphone, the home unit transformers and telephone lines to the school unit with its transducer 2a acting as a speaker.

If for any reason the teacher at the school unit wishes to interrupt the student's recitation and reverse the transmission direction to the normal school to home direction, the teacher merely actuates the switch 33, opening the same. This interrupts the emitter-base junction current in the transistors 10 and 18 irrespective of the position of the switch 9. With the interruption of the emitter-base junction current in the transistors, the collector current is also interrupted so that the relays 1 and 3 become deenergized, the switches 44 and 34 return to their normal position and the normal direction of school to home transmission is resumed.

The switch 33 thus acts as an over-riding priority control switch permitting the teacher to establish the normal direction of school to home transmission irrespective of the position of the student's press to talk or talk-listen switch 9.

The loop resistance of the telephone lines passing from the school through the telephone central office to the homebound child may be diagrammatically represented by the resistor 29. This loop resistance may be assigned a maximum value of about 2,500 ohms for the purposes of design analysis though there are instances where lines having greater loop resistances are encountered.

There is also a certain amount of leakage resistance between the two wires of the telephone pair due to cracked insulation, moisture, etc. which may be diagrammatically represented by the resistor 20. For design purposes, this leakage resistance may be assigned a minimum value of about 10,000 ohms.

It is apparent that undesirable current may flow across the emitter base junction 37 due to the presence of the leakage resistance 20. Such current caused by the leakage resistance may tend to operate the relay 1 which, of course, would interfere with normal operation. If the resistor 29 has its maximum assigned value, 2,500 ohms, and the leakage resistance 20 has a minimum assigned value of 10,000 ohms, the change of current flow across the junction 37 upon the closing of the switch 9 represents a maximum possible current ratio of 4 to 1 between the operated and non-operated conditions. It is thus necessary to use very close design tolerances if reliable operation is to be assured in spite of the leakage resistance.

In accordance with a preferred embodiment of the applicant's invention, this disadvantage is overcome by connecting a resistance and a further D. C. source of opposite polarity to the normal D. C. source in parallel across the emitter base junction of the transistor of the school unit.

As shown, a source of D. C. current 36, having opposed polarity to the D. C. source 21 and the resistor 35 is connected to the emitter 12 and base 14 of the transistor in parallel with the D. C. source 21 and line 22.

If the D. C. source 36 is made equal in potential to the D. C. source 21 and the resistor 35 had a value of 10,000 ohms to equal the leakage resistance 20, it is apparent that the D. C. source 36 and resistor 35 will then set up a current flow across the emitter base junction 37 equal to the flow created by the D. C. source 21 and leakage resistance 20 but of opposite polarity so that said leakage current flow is exactly balanced out. Under these conditions the ratio of operated to non-operated current across the emitter base junction 37 caused by the closing of the switch 9 may theoretically reach an infinite value and, in practice, may be sufficiently large to achieve reliable operation without critical tolerances in the circuit design. An approximate preferable design equation is that the product of the voltage of the D. C. source 21 and the leakage resistance 20 should be equal to the product of the voltage of the D. C. source 36 and the resistor 35.

The leakage resistance 20 is variable and it is normally assigned a minimum value below which the line is no longer considered fit for service. In the example given this minimum value was assigned as 10,000 ohms. In all practical cases, the leakage resistance 20 of the telephone lines is likely to have a much higher value than 10,000 ohms and, in fact, in connection with lines in good condition and very high leakage resistance it may be considered infinite for purposes of the design analysis of the circuit to determine the effect of the balancing network consisting of the D. C. source 36 and resistor 35. No current will be caused to flow across the junction 37 by the D. C. source 36 and resistor 35 due to the polarity involved, i. e. the rectifying effect of the transistor. The current, produced upon the closure of the switch 9, in order to flow must first buck out the current of the balancing network across the emitter-base junction and still be sufficient so that the collector current caused thereby will energize the relay. With the practical values cited above, it may be seen that the current that will flow through the emitter base junction 37 is approximately ¾ as great as would have been had the D. C. source 36 and resistor 35 not been used. If the line has a certain amount of leakage, i. e. if the resistance 20 has a finite value, the current flow across the junction 37 will be somewhere between ¾ of the normal current and the normal current. This permits the assignment of circuit constant to assure reliable operation with reasonable production tolerances in spite of the presence of leakage resistance across the line. It is also apparent that if the line can be assumed to have a higher value of minimum leakage resistance, as for example, 20,000 ohms then the loop resistance 29 for which the circuit can be designed can also be doubled thus taking care of the problem of long high resistance lines which may be found in rural areas.

If the D. C. source 21 is at the home unit rather than at the school unit it is apparent that undesirable current can not flow across the emitter base junction 38 due to the leakage resistance 20 with the switch 9 open. Such undesirable current, which could interfere with normal operation, would only flow with the switch 9 closed and with the switch 33 open, i. e. when the over-riding priority control is used at the school unit. In order to prevent this, if D. C. current 21 is at the home unit, the D. C. source 36 and the resistor 35 could be connected in the manner as shown but at the home unit.

If half of the D. C. source 21 is provided at the school unit and half at the home unit the design tolerance is automatically doubled so that in certain instances, the D. C. source 36 and resistor 35 may be dispensed with. If, however, with half D. C. source 21 at the home unit and half at the school unit it is still desirable to further increase the design tolerances, then a D. C. source 36 and resistor 35 must be provided at each unit. In this case, at each unit the product of the voltage of the D. C. source 36 and the resistor 35 should be equal to the product of the leakage resistance 20 and the D. C. source 21 at each particular unit.

While the invention has been described with reference to the specific embodiments shown, various changes and modifications will become apparent to the skilled artisan which fall within the spirit of the invention and the scope of the appended claims.

I claim:

1. In an electrical inter-communication system having electrical transducers at separated points, a two wire transmission line coupling said transducers, electrical switching means for establishing the direction of electrical audio signal flow between said transducers over said transmission lines, said switching means including manually operable means at one end portion of said transmission line associated with one of said transducers, automatically operable means at the other end portion of said transmission line associated with the other said transducer, and means including said two wire transmission line operating said automatically operable means by operation of said manually operable means, the improvement which comprises over-riding priority control means including a manually operable switch associated with the same transducer as said automatically operable means for establishing a direction of electrical audio signal flow from said last mentioned transducer as a microphone to the other transducer as a loud speaker irrespective of the position of the manually operative means of said switching means.

2. In a school-to-home electrical intercommunication system having a school unit and a home unit with electrical transducers coupled by a two wire telephone line, said units normally being connected for electrical audio signal flow from the transducer of said school unit as a microphone over said telephone lines to the transducer of said home unit as a speaker, electrical switching means for reversing the direction of electrical audio signal flow between said transducers over said telephone lines, said switching means including manually operable means at said home unit and automatically operable means at said school unit, and means including said telephone lines for operating said automatically operable means by operation of said manually operable means, the improvement which comprises over-riding priority control means including a manually operable switch at said school unit for reestablishing the direction of an electrical audio signal flow from said school unit to said home unit irrespective of the position of said manually operable means of said switching means.

3. In an electrical intercommunication system having electrical transducers at separated points, two wire transmission lines coupling said transducers, electrical switching means for establishing the direction of electrical audio signal flow between said transducers over said transmission lines, the improvement which comprises said switching means including a separate relay operated switch, transistor and D. C. source associated with each transducer, the collector circuit of the transistor, and D. C. source and the coil of the relay operated switch of each transducer associated unit being connected in series, means including said transmission line connecting the emitter-base junction circuit of said transistors in series with each other, D. C. current means for said series connected emitter-base junction circuit, a manual switch associated with one of said transducers in said series connected emitter-base junction circuit and a separate manual switch associated with the other said transducer in said series connected emitter base junction circuit, said switching means establishing one direction of electrical audio signal flow upon energization of both said relays and reverse direction of electrical audio signal flow upon deenergization of both said relays.

4. Improvement according to claim 3 in which one of said manual switches is normally open and the other is normally closed, said switching means establishing a direction of electrical audio signal flow from said transducer associated with said normally closed switch to the other said transducer with said relays deenergized.

5. Improvement according to claim 4 including a resistor and D. C. current means connected in parallel with the emitter-base junction circuit of the transistor associated with said last mentioned transducer, said last mentioned D. C. current means having a polarity opposed to the polarity of said D. C. current means for said series connected emitter-base junction circuit.

6. Improvement according to claim 5 in which said D. C. current means and resistor have a value so that the product of the voltage of said first mentioned D. C. current means for said series connected emitter-base junction circuit and the minimum leakage resistance across the wires of said transmission line is equal to the product of the voltage of said D. C. current means and said resistor connected in parallel with the emitter-base junction circuit.

7. Improvement according to claim 3 including a resistance and D. C. current means connected in parallel with the emitter-base junction circuit of one of said transistors, said last mentioned D. C. current means having a polarity opposing the polarity of said D. C. current means for said current connected D. C. emitter-base junction circuits.

8. Improvement according to claim 7 in which said D. C. current means and resistor have a value so that the product of the voltage of said first mentioned D. C. current means for said series connected emitter base junction circuit and the minimum leakage resistance across the wires of said transmission line is equal to the product of the voltage of said D. C. current means and said resistor connected in parallel with the emitter-base junction circuit.

9. In a school-to-home electrical intercommunication system having a school unit and a home unit with electrical transducers coupled by a two wire telephone line, said units normally being connected for electrical audio signal flow from the transducer of said school unit as a microphone over said telephone line to the transducer of said home unit as its speaker, and electrical switching means for reversing the direction of electrical audio signal flow between said transducers over said telephone lines, the improvement which comprises said switching means including a separate relay operated switch, transistor and D. C. current source for said home unit and for said school unit, the collector circuit of the transistor, the D. C. source and the coil of the relay operated switch of each unit being connected in series, means including said telephone lines connecting the emitter-base junction circuit of said transistors in series with each other, D. C. current means for said series connected emitter-base junction circuits, a manually operable, normally closed, switch in said series connected emitter-base junction circuit at said school unit, a separate manually operable switch in said series connected emitter-base junction circuit at said home unit, said switching means establishing a direction of electrical audio signal flow from said school unit over said telephone line to said home unit upon deenergization of both of said relays and a reverse direction of electrical audio signal flow upon energization of both of said relays.

10. Improvement according to claim 9 including a resistance and D. C. current means connected in parallel with the emitter base junction circuit of one of said transistors, said last mentioned D. C. current means having a polarity opposing the polarity of said D. C. current means for said series connected D. C. emitter-base junction circuits.

11. Improvement according to claim 10 in which said D. C. current means and resistor have a value so that the product of the voltage of said first mentioned D. C. current means for said series connected emitter-base junction circuit and the minimum leakage resistance across the wires of said telephone line equal to the product of the voltage of said D. C. current means and said resistor connected in parallel with the emitter-base junction circuit.

12. Improvement according to claim 9 including a resistance and D. C. current means connected in parallel with the emitter-base junction circuit of the transistor of said school unit, said last mentioned D. C. current means having a polarity opposed to the polarity of said D. C. current means for said series connected emitter-base junction circuit.

13. Improvement according to claim 12 in which the product of the voltage of said D. C. current means and said resistance connected in parallel with the emitter base junction circuit is substantially equal to the product to the voltage of D. C. current means for said series connected emitter-base junction circuit and the leakage resistance across the wires of said telephones lines.

No references cited.